US011298912B2

(12) United States Patent
Drew et al.

(10) Patent No.: US 11,298,912 B2
(45) Date of Patent: Apr. 12, 2022

(54) CUTTING OF ADHESIVE MATERIALS WITH WATER-SOLUBLE PROTECTIVE LAYER

(71) Applicant: Aquasam Limited, Great Dunmow (GB)

(72) Inventors: Bruce Michael Drew, Great Dunmow (GB); David Charles Welch, Crewkerne (GB); Michael John Cooper, Colchester (GB); Shilpan Pravin Patel, Andheri (West) Numbai (IN)

(73) Assignee: Aquasam Limited, Great Dunmow (GB)

(*) Notice: Subject to any disclaimer, the term of this patent is extended or adjusted under 35 U.S.C. 154(b) by 0 days.

(21) Appl. No.: 16/755,564

(22) PCT Filed: Oct. 5, 2018

(86) PCT No.: PCT/GB2018/000132
§ 371 (c)(1),
(2) Date: Apr. 11, 2020

(87) PCT Pub. No.: WO2019/073187
PCT Pub. Date: Apr. 18, 2019

(65) Prior Publication Data
US 2020/0307143 A1    Oct. 1, 2020

(30) Foreign Application Priority Data
Oct. 13, 2017 (GB) ..................... 1716905

(51) Int. Cl.
*B32B 3/10* (2006.01)
*C09J 7/29* (2018.01)
(Continued)

(52) U.S. Cl.
CPC ............... *B32B 3/10* (2013.01); *B31D 1/02* (2013.01); *B32B 7/06* (2013.01); *B32B 7/12* (2013.01);
(Continued)

(58) Field of Classification Search
CPC .... B32B 3/10; B32B 7/06; B32B 7/12; B32B 2307/402; B32B 2307/7166;
(Continued)

(56) References Cited

U.S. PATENT DOCUMENTS 5,968,624 A * 10/1999 Liebe, Jr. ............... B44C 1/162
156/230
7,828,923 B2   11/2010 Patel
10,388,191 B2   8/2019 Henderson

FOREIGN PATENT DOCUMENTS

WO    2011132466    10/2011

OTHER PUBLICATIONS

ISR from corresponding PCT application.

* cited by examiner

*Primary Examiner* — Patricia L. Nordmeyer
(74) *Attorney, Agent, or Firm* — Stephen T. Scherrer; Monique A. Morneault; Scherrer Patent & Trademark Law, P.C.

(57) ABSTRACT

A pre-assembled kit of cut shapes disposed upon a peelable or repositionable adhesive by means of an affixing adhesive protected by a water-soluble coating which is solubilised either prior to and/or on application of the kit to a surface which may be moistened prior to application. When the water-soluble coating is solubilised, in whole or in part, by placing in contact with the moistened surface, it will expose and/or activate, in whole or in part, the pressure-sensitive adhesive beneath the water-soluble coating to the surface to which it is to be applied and the pre-assembled kit will become affixed to the surface. Alternatively, solubilisation of the water-soluble coating may be provided by applying water, preferably warm water, to the water-soluble coating prior to applying the pre-assembled kit to the surface. A method of producing the pre-assembled kit of cut shapes is (Continued)

Figure 4:
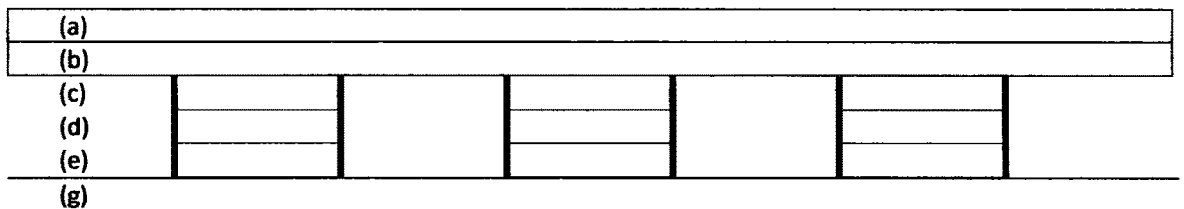

Example after cutting of first material prior to removal of skeleton

| (a) | | | | | | |
|---|---|---|---|---|---|---|
| (b) | | | | | | |
| (c) | | | | | | |
| (d) | | | | | | |
| (e) | | | | | | |
| (f) | | | | | | | provided. In preferred embodiments the protective water-soluble coating is substantially a formulation of poly-vinyl alcohol or polyurethane polymers.

19 Claims, 2 Drawing Sheets

(51) Int. Cl.
    *C09J 7/38*     (2018.01)
    *B32B 7/06*     (2019.01)
    *B32B 7/12*     (2006.01)
    *B31D 1/02*     (2006.01)

(52) U.S. Cl.
    CPC . *C09J 7/29* (2018.01); *C09J 7/38* (2018.01); *B32B 2307/402* (2013.01); *B32B 2307/7166* (2013.01); *B32B 2307/7265* (2013.01); *C09J 2203/334* (2013.01); *C09J 2429/005* (2013.01); *C09J 2475/005* (2013.01); *Y10T 428/1495* (2015.01)

(58) Field of Classification Search
CPC ............ B32B 2307/7265; B32B 15/12; B32B 2307/732; B32B 2255/26; B32B 2255/12; B32B 2307/546; B32B 2307/414; B32B 2307/4023; B32B 2255/28; B32B 2307/71; B32B 27/12; B32B 15/14; B32B 2405/00; B32B 2255/10; B32B 5/022; B32B 15/08; B32B 27/10; B32B 29/02; B32B 2519/00; B32B 2307/75; B32B 2307/412; B31D 1/02; C09J 7/29; C09J 7/38; C09J 2203/334; C09J 2429/005; C09J 2475/005; Y10T 428/1495
See application file for complete search history.

Figure 1

Example of combined material prior to cutting

| (a) |
|---|
| (b) |
| (c) |
| (d) |
| (e) |
| (f) |

Figure 2

Example after cutting of first material prior to removal of skeleton

Figure 3

Example after cutting of first material and removal of the skeleton

Example after affixing the pre-assembled kit to a moistened surface which solubilises the water-soluble coating Example after affixing the pre-assembled kit to a moistened surface and removing the second material Front elevation of pre-assembled kit after array is affixed to a moistened surface

CUTTING OF ADHESIVE MATERIALS WITH WATER-SOLUBLE PROTECTIVE LAYER

This invention relates to adhesive materials. More especially, but not exclusively, the invention relates to an array of cut shapes coated with an affixing adhesive where the affixing adhesive is protected with a water-soluble coating in order to prevent the material from which the shapes may be cut, from blocking when wound on rolls.

Such arrays of cut shapes are currently affixed with a pressure-sensitive adhesive provided on a release liner which is discarded subsequent to use by the applicator.

As in many other business sectors, environmental pressures are of increasing importance in the self-adhesive material business. In all pressure-sensitive adhesive materials, the pressure-sensitive adhesive needs to be protected in order that the material can be wound into rolls.

The two currently most used methods of protection are:
(i) a siliconised coating on the opposite side of the substrate to the pressure-sensitive material (in the case of self-wound materials) and
(ii) laminating to a substrate, often described as a "siliconised liner" or simply a "liner", on one side of which a siliconised coating has previously been applied.

Self-adhesive materials are often required to be printed and cut into different shapes, both for the label market and for the graphic arts market. In the graphic arts market, the latter method of protection is required as firstly, it is necessary to cut against the siliconized substrate and thereafter remove the skeleton of the pressure-sensitive material leaving the cut shapes as an array on the siliconised substrate (as is the case, for example, of current British postage stamps) and secondly, a siliconised top surface (as is the case of self-wound materials) is generally incompatible with print receptiveness.

Use of a water-soluble coating as a protector in place of a siliconized substrate offers the significant advantages of both a cost reduction and an environmental benefit—the waste siliconized substrate cannot easily be recycled due to its silicone coating. However, the use of a water-soluble coating as a protector in place of a siliconised substrate prevents cutting by typically used methods as there is no longer an adequate substrate to cut against. The present invention describes a material and an operating method, both of which incorporate the use of a water-soluble coating as a protector and yet allow cutting of an array of shapes, thus overcoming the above obstacles and offering a person applying an array of cut shapes to a surface, a ready-to-use solution to a hitherto complicated problem.

In this invention, we describe a method of preparing cut shapes including for example, letters and numbers, in pre-determined positions with respect to each other as a pre-assembled kit ready for application to a surface which may or may not have been moistened prior to application of the array. The surface may be planar or curved in any direction. In the latter case, the curvature of the surface should not be so great that any of the cut shapes become wrinkled when applied to the curved surface.

In some embodiments, the pre-assembled kit may be prepared according to the following method. A first substrate which may be polymeric or paper or a lamination of both, optionally pre-coloured and/or capable of receiving print on its upper surface, is coated with an affixing adhesive on its lower surface. Pre-coloured in this context means coloured within its mass, or coloured by flood coating with ink, varnish or other coloured coatings, either prior to the first substrate being coated with an affixing adhesive or subsequent to it being coated with an affixing adhesive. The first substrate may have a thickness of 25 to 250 μm with a preferred thickness of 50-150 μm. Polyvinyl chloride (PVC) substrates may be preferred on account of their flexibility and UV stability. The first substrate may have a range of functional properties such as, by way of example only, transparent window film or reflective film. Alternatively, paper, textiles, non-woven materials, or other more environmentally favourable materials, particularly those which may be recycled, may be used in place of, and/or in combination with, polymeric materials.

The side of the first substrate which has been coated with an affixing adhesive will be referred to within this application as its lower surface. The affixing adhesive is preferably a pressure-sensitive adhesive which may be a hot melt adhesive, a solvent-based adhesive, a water-based adhesive or any adhesive which is not susceptible to significant reduction of tack when exposed to moisture. Where the affixing adhesive has been transfer coated to the polymeric, paper or laminated substrate, the release liner on which the affixing adhesive has been coated, is removed before the next stage of the manufacturing process. A wide range of types of affixing adhesives may be used, with a wide range of coating weights and functional properties, such as, for example only, permanent, easily removable, easily applied, or repositionable adhesives.

The affixing adhesive is then coated by means known to those skilled in the art, or otherwise covered, for example by spraying, with a water-soluble coating which is capable of being dried to provide a surface of sufficiently little tack to allow the material to be wound in a roll without risk of blocking. The affixing adhesive and the water-soluble coating may be applied to the first substrate by a dual coating method in which the water-soluble coating is applied to the upper surface of the affixing adhesive simultaneously with the affixing adhesive or sequentially following the affixing adhesive. In this manufacturing process, both affixing adhesive and water-soluble coating are applied to the first substrate during a single process step thus avoiding the need for two drying stages. It is advantageous if the affixing adhesive requires little or no drying as would be the case if the affixing adhesive was, for example, a hotmelt adhesive. Simultaneous or sequential dual layer "wet-on-wet" coating provides an original method to apply this combination of coatings and thereby produce a novel laminate, although other manufacturing process options may be used depending upon coating equipment already installed. Options may include applying the water-soluble coating to the affixing adhesive by spraying prior to the simultaneous drying of the two layers.

Whether the two coatings are applied sequentially or simultaneously, the surface tensions of the two coatings are preferably adjusted so that the water-soluble coating is able to wet out completely the affixing adhesive. In whatever manufacturing process is used, the resulting label stock is able to be wound in a roll without risk of blocking. The term blocking should be understood in this context to mean that the roll cannot be unwound due to the material sticking to itself within the roll.

Examples, which should not be taken to be limiting, of preferred formulations of the water soluble coating are those based substantially upon water soluble polyvinyl alcohol and/or water soluble polyurethane polymers. The water-soluble coating may typically be of 15-75% solid matter, and is preferably of 20-40% solid content, dissolved or dispersed within preferably an aqueous solvent system although other solvent systems may be suitable for use in the context of the present invention provided that an appropriate drying system is suitably provided. The water-soluble coating is preferably selected for its readiness to dissolve either when removed prior to application to a surface and/or when placed in contact with a moistened surface. The water-soluble coating is applied sufficiently thinly to allow the shortest time to expose the affixing adhesive either by removal in advance of application and/or by placing in contact with a moistened surface during application, but sufficiently thickly to cover the affixing adhesive completely, or at least where the cover is incomplete, sufficiently to prevent blocking. The resulting material ("the first material") can then either be wound into a roll or be passed unwound "in-line" to the next stage of the manufacturing process.

The thickness of the water-soluble coating may typically be between 1 and 10 gsm dry weight, preferably between 3 and 7 gsm and most preferably between 4 and 6 gsm. Many water-soluble coatings and substrates include water as part of their plasticisation system and need some moisture to be retained to provide flexibility. The term dry weight in the context of this invention therefore means the coat weight at which the water-soluble coating is no longer tacky when touched and no longer blocks when the first material is wound within a roll.

In this application, the term water-soluble coating is taken to include coatings which are either water-soluble or water-dispersible or a combination thereof. When used in the context of this invention, it is difficult to measure accurately the time taken for the water-soluble coating to solubilise thereby exposing the affixing adhesive. A method for determining the suitability of a water-soluble coating for use in the context of this invention is to cast a water-soluble substrate upon a glass plate or a release liner, preferably using the same coating head as has been used to apply the water-soluble coating to the affixing adhesive. The thickness of the water-soluble substrate should be identical to the thickness of the water-soluble coating covering the affixing adhesive. Water-soluble substrates made from preferred water soluble polymers for use in coatings in the context of the present invention are preferably capable of complete solubilisation in water of a temperature of 20° C. contained within a stirred vessel in less than 60 seconds using a standard method.

A second substrate which has been coated with a peelable or repositionable pressure-sensitive adhesive to form the second material is then brought into contact by lamination or otherwise with the first material to form the combined material. The peelable or repositionable pressure-sensitive adhesive is preferably selected to withstand exposure to moisture without any significant change in functionality, and to offer an unwind adhesion value of less than 2.0 Newtons per inch after 30 minutes conditioning using a 180° peel at 0.3 m/min as described in ASTM D3811 and ASTM D3811M-96, and preferably less than 1.0 Newtons per inch. The second substrate is preferably a transparent or translucent polymeric substrate for reasons which are described below, and is presented unwound from a self-wound roll or "in-line" from a previous process. The peelable or repositionable pressure-sensitive adhesive of the second material is brought into contact with the top surface of the first material.

In other embodiments, an alternative sequence of manufacturing steps is provided by laminating the second material to the upper surface of the first substrate before coating the lower surface with the affixing adhesive. In this method, the affixing adhesive may be applied by dual coating the lower surface of the first substrate by a simultaneous or a sequential dual coating process as has been described above. In this manufacturing method, the first substrate is able to receive support from the second material as it moves through the process which is of particular benefit where the dual coatings are dried by passage through a drying tunnel. Some types of first substrate, especially those based upon polyvinyl chloride, may be distorted by the heat of the drying tunnel were they not to be supported by the second material. In a similar way to what has already been described in the first aspect, it is advantageous if the affixing adhesive requires little or no drying as would be the case if the affixing adhesive was, for example, a hotmelt adhesive.

In some embodiments, the top surface of the first material may be printed using any print process known to one skilled in the art prior to lamination to the second material. Printing may be carried out by a variety of processes, including screen printing and digital printing upon a number of possible substrates including by way of example, polymeric substrates such as those made from polyvinyl chloride and polyester, and non-woven fabrics, papers, metallic films and blends thereof.

First materials can consist of thicknesses of substrate ranging for example from 25 to 250 μm. The printing of the upper or top surface of the first material is preferably carried out before the first and second materials are brought together to form the combined material. The bringing together of the printed first material and the second material may either take place as part of an integrated process within a single factory, or alternatively, the first and second materials may be provided separately to a print process and only after the top surface of the first material has been printed are the first and second materials brought together to form the combined material.

In some embodiments, the combined material may be provided to a print process wherein the second material is removed during the print process in order to allow the top surface of the first material to be printed, and then the second material is replaced in its original position within the combined material. As has been mentioned earlier, it is preferable that the polymeric substrate of the second material is transparent or translucent so that the printed upper surface of the first material is visible to the naked eye through the polymeric substrate of the second material. The polymeric substrate of the second material may be plain or embossed prior to being coated with a peelable or repositionable pressure sensitive adhesive.

It has been found that an embossed polymeric substrate provides advantages including:
  i) an easier unwind of the combined material due to the reduced surface area of an embossed material in contact with the water-soluble coating covering the affixing adhesive of the first material and
  ii) an easier removal from the upper surface of the array of cut shapes after application due to the reduced surface area of peelable or repositionable pressure sensitive adhesive in contact with upper surface of the array of cut shapes.

The combined material is now ready for cutting into shapes to form an array. The cutting may be made on either a flat or a cylindrical surface. The cutting may be provided by any suitable means and may be provided by computer driven moving knife or laser cut or classic die-cut knife, as examples of the method of cutting shapes, although these examples are by no means limiting. The cutting tool enters the combined material from the water-soluble coating side and cuts the first material into cut shapes but importantly, the cutting tool does not cut the second material which remains substantially untouched by the cutting process. The first material surrounding the cut shapes ("the skeleton") can now be removed by peeling from the second material, an operation known as "weeding". The peelable or repositionable adhesive holding the first material and the second material together is selected to allow the first material surrounding the cut shapes to be removed without damage to the cut shapes which remain held to the second material. Once the skeleton has been "weeded", what remains is the pre-assembled kit, ready for installation as an array by a person who will apply the kit to the intended surface, known herein as the applicator.

The applicator will now affix the pre-assembled kit to the intended surface. The water-soluble coating must be substantially removed prior to or during application in order to expose the affixing adhesive of the first material.

Removal of the water-soluble coating prior to application is preferably effected by using a sponge soaked in water at ambient temperature which, in the context of the present invention, is taken to be typically 20° C. Where warmer water, for example of between 30° C. and 40° C., is used, solubilisation of the water-soluble coating will be effected more quickly. The sponge is typically brushed several times across the coating, and any excess water is wiped away. The exposed affixing adhesive is preferably dried using a current of warm air in order to reduce thereby the time required to affix the array strongly to the intended surface i.e. without risk of subsequent movement of the array or part thereof following application to the intended surface.

Removal of the water-soluble coating during application may also be effected by applying the array to a surface which has been moistened with water at ambient temperature which, in the context of the present invention, is taken to be typically 20° C. The water may be applied to the intended surface by means of a trigger spray bottle and may contain a small amount of ethyl or iso-propyl alcohol in order to wet the surface more effectively and to encourage drying once the pre-assembled kit has been placed in position. A typical percentage of alcohol is between 5% and 15% by volume. In climates where the ambient temperature of water is below 20° C., it may be necessary to provide warming of the water. Where warmer water of between 30° C. and 40° C. is used, solubilisation will be effected more quickly. When the water-soluble coating is placed in contact with the moistened surface, it will dissolve, or at least partially dissolve, exposing totally or partially the affixing adhesive beneath the water-soluble coating to the surface to which it is to be attached. Any aqueous solution containing the solubilised water-soluble coating may be wiped to the edges of the pre-assembled kit using a squeegee or similar tool. As a result of the solubilisation of the water-soluble coating, the affixing adhesive will become exposed to the surface and/or otherwise activated and the cut shapes within the pre-assembled kit will adhere to the intended surface. The presence of residual moisture between the affixing adhesive and the intended surface will cause delay in achieving strong adherence of the array to the intended surface, and therefore, in practice, the less residual moisture between the affixing adhesive and the intended surface, the better.

After a suitable period of time, typically minutes rather than hours, the cut shapes constituting the pre-assembled array will have adhered to the intended surface sufficiently strongly for the second material to be peeled away leaving the cut shapes adhered to the surface. The time for sufficiently strong adherence to the intended surface for the second material to be peeled away without disturbing the array has been found to be shortened by removal of the water-soluble coating prior to application as described above. Removal during application by solubilisation has been found to offer greater simplicity of application which is of particular benefit where speed to develop sufficiently strong adherence to the intended surface is of less importance.

It will now be apparent why the peelable or repositionable pressure-sensitive adhesive should preferably be unaffected by exposure to moisture.

In another aspect, the invention provides a pre-assembled kit of cut shapes disposed upon a peelable or repositionable pressure-sensitive adhesive material wherein by means of an affixing adhesive which becomes exposed and/or activated by removal in whole or in part of a water-soluble protective coating prior to and/or during application, the cut shapes remain affixed to a surface as an array once the peelable or repositionable adhesive material is removed.

In another aspect, the invention provides a material comprising a first substrate wherein a lower surface is coated with an affixing adhesive, which is protected from blocking by a protective watersoluble coating, and a second substrate coated with a moisture resistant peelable or repositionable pressure-sensitive adhesive which is laminated to an upper surface of the first substrate, against 15 which second substrate cut shapes can be formed in the first substrate.

In another aspect, the invention provides a method of providing a pre-assembled kit of cut shapes capable of being affixed to an intended surface by solubilisation of a protective water-soluble coating applied to an affixing adhesive on a lower surface of a first substrate, wherein the relative 20 positions of each cut shape are retained within an array.

Embodiments of the invention will now be described by way of example only with reference to FIGS. 1 through 6, of the accompanying drawings.

In the Figures, which are illustrative only, the layers may be identified as follows:
(a) A polymeric preferably transparent substrate
(b) A moisture resistant peelable or repositionable pressure sensitive adhesive
(c) An optionally printed upper surface of layer (d)
(d) A polymeric or paper substrate or lamination of both, preferably coloured and/or capable of receiving print on its upper surface
(e) A moisture resistant affixing adhesive, preferably a pressure sensitive adhesive
(f) A water-soluble coating
(g) A surface, optionally moistened, to which the array of cut shapes is to be affixed The layers may comprise any of the materials previously mentioned.

In FIG. 1, the combined material is illustrated. Layers (c), (d), (e) and (f) represent the first material and layers (a) and (b) represent the second material. The first material and the second material are laminated together as illustrated to provide a combined material.

In FIG. 2, the first material has been cut into shapes as illustrated by the thicker black lines. It will be noted that the second material has not been cut.

In FIG. 3, the skeleton surrounding the cut shapes has been removed leaving only the shapes cut from the first material still attached to the second material.

In FIG. 4, either following removal of a protective water-soluble coating prior to application, or by solubilisation during application, or a combination of both methods, the combined material, now with the affixing adhesive activated, is presented to a surface (g). In each case, the water-soluble coating (f) is solubilised by the presence of moisture. Residual solubilised water-soluble coating is moved away from beneath the shapes by downward pressure on layer (a) by manual means and/or by the action of a squeegee, the affixing adhesive (e) comes into contact with the surface (g) and the shapes adhere to the surface.

Figure 5:
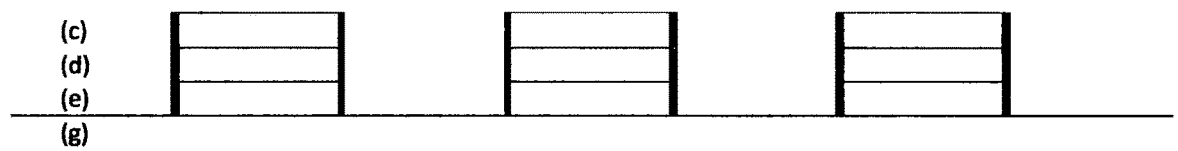

In FIG. 5, the second material, illustrated by layers (a) and (b) in FIG. 4, has been removed leaving the cut shapes attached to the surface (g). It will be noted that the pressure-sensitive adhesive (b), being a moisture resistant peelable or repositionable adhesive, remains unaffected by the presence of moisture and may be removed from the cut shapes without disturbing their attachment to the surface (g) due to affixing adhesive (e).

Figure 6:
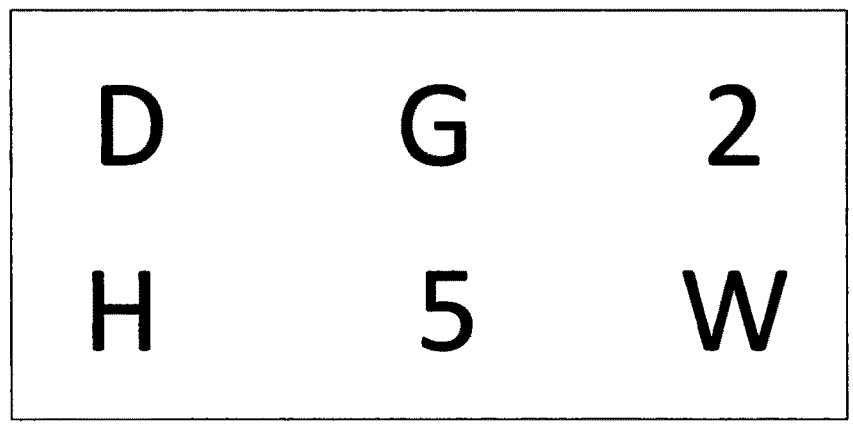

In FIG. 6, an array-of cut shapes, illustrated, by way of example only, as six letters D-G-2 and H-5-W, has been affixed to the surface (g). It is important to note that the relative position of each shape within the array has not been disturbed by the removal of the second material.

The invention claimed is:

1. A pre-assembled kit of cut shapes comprising:
   a first substrate coated on a first side with an affixing adhesive protected by a water-soluble coating;
   a second substrate coated with a peelable or repositionable adhesive disposed upon a second side of the first substrate such that the peelable or repositionable adhesive is between the first and second substrates;
   an array of cut shapes and a skeleton formed by cutting through the first substrate;
   wherein the array of cut shapes remains disposed upon the peelable or repositionable pressure-sensitive adhesive of the second substrate, after the skeleton has been removed from around the array of cut shapes;
   wherein the affixing adhesive becomes exposed and/or activated by removal in whole or in part of the water-soluble protective coating prior to or during application of the array of cut shapes to a surface; and
   wherein the array of cut shapes remains affixed to the surface in a predetermined position once the second substrate and peelable or repositionable adhesive is removed.

2. The pre-assembled kit of cut shapes according to claim 1 wherein solubilisation of the water-soluble protective coating is provided by applying water to the water-soluble coating prior to applying the pre-assembled kit to the surface.

3. The pre-assembled kit of cut shapes according to claim 1 wherein solubilisation of the water-soluble protective coating is provided by applying water to the surface prior to applying the pre-assembled kit to the surface, wherein the water temperature is typically 20° C., and/or wherein optionally the water contains between 5% and 15% by volume of ethanol or iso-propyl alcohol.

4. The pre-assembled kit of cut shapes according to claim 1 wherein the affixing adhesive is a pressure sensitive adhesive.

5. The pre-assembled kit of cut shapes according to claim 1 wherein the protective water-soluble coating is substantially a formulation of poly-vinyl alcohol polymers, or substantially a formulation of polyurethane polymers, or substantially an aqueous formulation.

6. The pre-assembled kit of cut shapes according to claim 1 wherein the second substrate is an embossed polymeric substrate.

7. The pre-assembled kit of cut shapes according to claim 1 wherein the affixing adhesive and the water-soluble protective coating are applied to the first substrate by dual coating.

8. A method of providing a pre-assembled kit of cut shapes capable of being affixed to a surface, method comprising the steps of:
   providing a first substrate coated on a first side with an affixing adhesive protected by a water-soluble coating;
   providing a second substrate coated with a peelable or repositionable adhesive disposed upon a second side of the first substrate such that the peelable or repositionable adhesive is between the first and second substrates;
   forming an array of cut shapes and a skeleton by cutting through the first substrate;
   wherein the array of cut shapes remains disposed upon the peelable or repositionable pressure-sensitive adhesive of the second substrate, after removing the skeleton from around the array of cut shapes;
   exposing and/or activating the affixing adhesive by removal in whole or in part of the water-soluble protective coating prior to or during application of the array of cut shapes to the surface; and
   wherein the array of cut shapes remains affixed to the surface in a predetermined position once the second substrate and peelable or repositionable adhesive is removed.

9. A method according to claim 8 wherein the affixing adhesive is a pressure sensitive adhesive, wherein the temperature of the water used for solubilisation of the water-soluble coating is 20° C. or higher.

10. A method according to claim 8 wherein the second substrate provides a backing against which the cut shapes are formed in the first substrate.

11. A method according to claim 10 wherein the second side of the first substrate is printed before the second substrate is affixed to the second side or wherein the second substrate is removed from the combined first and second substrates to allow the second side of the first substrate to be printed and the second substrate then replaced in its original position.

12. A method according to claim 10 wherein the second substrate is transparent or translucent and/or wherein the second substrate is embossed.

13. A method according to claim 8 wherein the first substrate is pre-coloured.

14. A method according to claim 8 wherein the cut shapes are selected from numbers, letters, logos, pictures, internationally recognised symbols, or any combination thereof and/or wherein the cut shapes are surrounded by the skeleton that is removed prior to affixing the cut shapes to a surface.

15. A method according to claim 8 wherein the water soluble protective coating is substantially based upon poly-vinyl alcohol or polyurethane polymers and/or wherein the first substrate is selected from polymeric materials, non-woven fabrics, papers and metallic films, or a blend thereof.

16. A method according to claim 8 wherein the cut shapes are laser cut or die cut.

17. A method according to claim 8 wherein the first substrate has a thickness of 25 to 250 μm.

18. A method according to claim 8 wherein the water soluble protective coating contains 15 to 75% solids.

19. A method according to claim 8 wherein the water soluble protective coating has a thickness corresponding to 1.0 to 10 gsm dry weight, most preferably 4 to 6 gsm dry weight.

* * * * *